(12) United States Patent
Cook et al.

(10) Patent No.: US 12,168,272 B2
(45) Date of Patent: Dec. 17, 2024

(54) GASLESS, MECHANIZED, FIELD-WELDING OF TUBULAR STRUCTURE

(71) Applicant: Pipeline Supply and Service LLC, Houston, TX (US)

(72) Inventors: Marcus Cook, Houston, TX (US); Peter Nicholson, Houston, TX (US)

(73) Assignee: Pipeline Supply & Service, LLC, Houston, TX (US)

( * ) Notice: Subject to any disclaimer, the term of this patent is extended or adjusted under 35 U.S.C. 154(b) by 512 days.

(21) Appl. No.: 17/390,431

(22) Filed: Jul. 30, 2021

(65) Prior Publication Data
US 2022/0088697 A1     Mar. 24, 2022

Related U.S. Application Data

(60) Provisional application No. 63/080,413, filed on Sep. 18, 2020.

(51) Int. Cl.
| | |
|---|---|
| *B23K 9/32* | (2006.01) |
| *B23K 9/00* | (2006.01) |
| *B23K 9/028* | (2006.01) |
| *B23K 9/095* | (2006.01) |
| *B23K 9/10* | (2006.01) |

(52) U.S. Cl.
CPC ............ *B23K 9/327* (2013.01); *B23K 9/0052* (2013.01); *B23K 9/0286* (2013.01); *B23K 9/0953* (2013.01); *B23K 9/1087* (2013.01); *B23K 9/0282* (2013.01)

(58) Field of Classification Search
CPC ............ B23K 37/0294; B23K 37/0533; B23K 9/0052; B23K 9/0282; B23K 9/0286; B23K 9/0953; B23K 9/1087; B23K 9/327

USPC ........................................................ 219/130.1
See application file for complete search history.

(56) References Cited

U.S. PATENT DOCUMENTS

| | | | |
|---|---|---|---|
| 4,495,400 | A | 1/1985 | Thompson |
| 4,649,250 | A | 3/1987 | Kazlauskas |
| 5,099,098 | A | 3/1992 | Burgoon |
| 5,148,000 | A | 9/1992 | Tews |
| 6,297,472 | B1 | 10/2001 | Bong et al. |
| 9,132,499 | B2 | 9/2015 | Miller et al. |
| 9,776,272 | B2 | 10/2017 | Finav et al. |
| 9,969,025 | B2 | 5/2018 | Miller et al. |
| 10,500,665 | B2 | 12/2019 | Cash |

(Continued)

OTHER PUBLICATIONS

ISRWO for Application No. PCT/US21/50776 dated Dec. 15, 2021.

(Continued)

*Primary Examiner* — Dana Ross
*Assistant Examiner* — James F Sims, III
(74) *Attorney, Agent, or Firm* — C. Tumey Law Group PLLC

(57) ABSTRACT

A system and method provide gasless, mechanized, field welding of an exterior of a tubular structure such as a pipeline, without the need for an enclosure. An embodiment consolidates some of the welding equipment on a skid for ease of transport to and from a remote worksite. The gasless weld may be achieved despite the presence of wind, by precisely controlling an arc voltage as disclosed. The footprint and weight of the system may be minimized, along with the associated labor, expense, and environmental impact otherwise incurred by conventional welding techniques using enclosures.

29 Claims, 5 Drawing Sheets

(56) References Cited

U.S. PATENT DOCUMENTS

| | | |
|---|---|---|
| 10,695,876 B2 | 6/2020 | Rajagopalan et al. |
| 10,890,324 B2 | 1/2021 | Pezzo et al. |
| 11,926,003 B2 | 3/2024 | Cook et al. |
| 2002/0005397 A1 | 1/2002 | Bong et al. |
| 2003/0047585 A1 | 3/2003 | McCombe et al. |
| 2007/0119829 A1 | 5/2007 | Vietz et al. |
| 2007/0210049 A1 | 9/2007 | Dingeldein |
| 2013/0277345 A1 | 10/2013 | Holverson et al. |
| 2015/0129568 A1* | 5/2015 | Miller ................ B23K 37/0294 219/137.2 |
| 2015/0176758 A1 | 6/2015 | Nicholson et al. |
| 2015/0298238 A1 | 10/2015 | Van Rensburg |
| 2017/0120366 A1 | 5/2017 | Zucker et al. |
| 2018/0354054 A1 | 12/2018 | Barhorst et al. |
| 2019/0078778 A1 | 3/2019 | Pezzo et al. |
| 2020/0078882 A1 | 3/2020 | Jones et al. |
| 2020/0096961 A1* | 3/2020 | Darrow ................ G05B 19/29 |

OTHER PUBLICATIONS

Office Action Summary for U.S. Appl. No. 17/390,466 dated Jul. 31, 2023. PDF file. 10 pages.
Notice of Allowance for U.S. Appl. No. 17/390,466 dated Dec. 15, 2023. PDF file. 7 pages.

* cited by examiner

GASLESS, MECHANIZED, FIELD-WELDING OF TUBULAR STRUCTURE

CROSS-REFERENCE TO RELATED APPLICATIONS

The present application is a non-provisional of U.S. Patent Application No. 63/080,413, filed on Sep. 18, 2020, the entire disclosure of which is incorporated herein by reference.

BACKGROUND

Welding is a common technique in manufacturing for joining any number of components of similar composition to form a structure of virtually any desired size. Welding is commonly used to join many types of metals, as well as certain plastics. Most types of welding involve melting a portion of the pieces to be joined near an interface between those pieces. The melted material runs together and re-hardens as it cools, so that the two pieces become an essentially unitary structure. This provides an advantage over other joining processes like soldering and welding, in which a filler metal is instead melted at the interface, leaving two distinct parts joined by the solidified filler material. Other types of welding known in the art generally as "solid-state" welding do not melt the parent material. However, these are generally not suitable for larger structures.

Pipelines are among the many large structures that can be formed by welding. Pipelines are long vessels constructed to carry fluids, such as petroleum, chemicals, water, or sewage over long distances, from the source to some downstream destination where the fluids may be processed and/or sold. Multiple pipeline segments may be consecutively arranged end-to-end and joined to create a pipeline extending hundreds or thousands of miles or kilometers long. The enormity of such a structure, however, presents numerous challenges in its fabrication. The resulting economic and environmental impact can be significant.

Currently, many pipelines are constructed using gas-shielded welding techniques to achieve the desired weld quality needed to safely convey fluids and minimize the risk of failure or leakage. Gas-shielded techniques involve supplying an inert gas to the joint to displace oxygen and other contaminants that would otherwise degrade the quality of the weld joint. The use of gas-shielded welding on pipelines, in turn, requires the use of large enclosures (alternately referred to as shacks, huts, or houses) around every pipeline joint to be welded, such as shown in FIG. 1. These large enclosures are necessary, in part, to shield the pipeline joint to be welded from wind common to large, open spaces. Such wind and other external factors would otherwise blow away the inert gas supplied to the joint. Various welding equipment is also mounted to these large enclosures, adding to their size, weight, and cost. The shacks, in turn, require significant expenditures of human resources, equipment and capital especially if their location need to be in tight environmental terrains. One such terrain would be a trench as shown in FIG. 2. As can be seen, the trench requires an enormous amount of excavation to accommodate these shacks.

Transportation and implementation of these large enclosures introduces its own set of costs and challenges. For example, special vehicles having metal, tank-like treads or tracks are needed to transport them. The metal tracks can damage road surfaces, and the regulatory requirements in place to mitigate this damage adds to the cost and complexity. On-site, the use of these large enclosures also requires excavation of large portions of earth, with resulting environmental and economic impact.

The industry is always looking for new and better ways to reduce costs and minimize environmental impact. The present disclosure, having identified the foregoing needs, will now address these risks with various systems, devices, and methods that may represent a step-change improvement in how pipelines and other large, tubular structures may be constructed.

DETAILED DESCRIPTION

Figure 1:
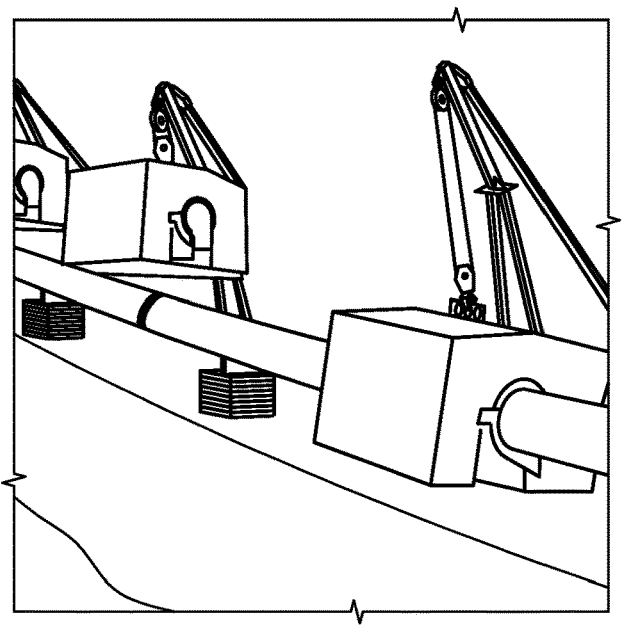
FIG. 1 is an elevation view of a pipeline under construction requiring the use of large enclosures known as shacks.
Figure 2:
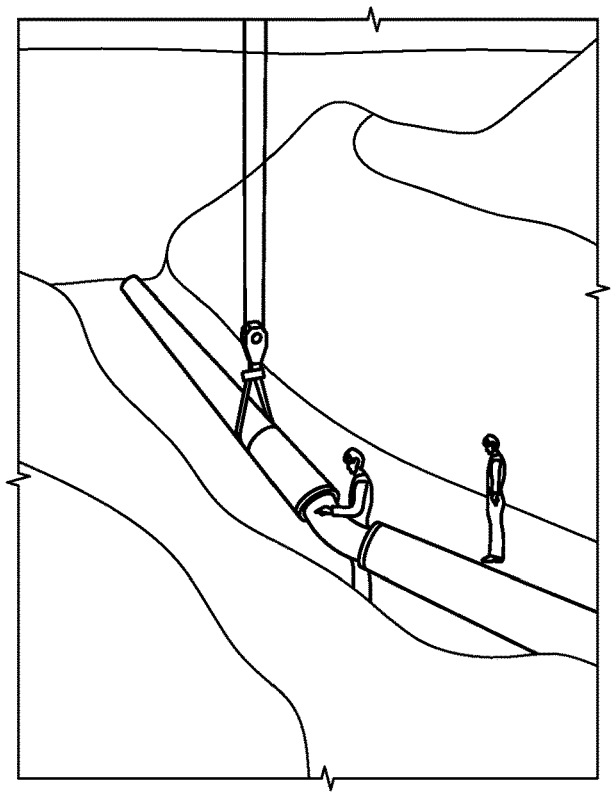
FIG. 2 is an elevation view of the pipeline as lowered into a trench as it is being built, as an example of the very large size of trench required for receiving such a shack.

A system and method are disclosed for gasless, mechanized, field welding of an exterior of workpiece. In some examples, the workpiece may be a tubular structure such as a pipeline. Gasless welding may be performed in the field without an enclosure, even in the presence of wind. The footprint and weight of the system may be minimized, along with the associated labor, expense, and environmental impact otherwise incurred by conventional welding techniques using enclosures.

In an example embodiment, the enclosure is eliminated via the use of gasless welding techniques, which do not require an auxiliary inert gas supply during welding. The gasless welding may be achieved in the field with a system configuration that combines, for example, precise local voltage measurement of the arc at a workpiece to be welded, low-inductance power and signal transmission using a coaxial cable coupling the gasless torch to a welding machine, and precisely controlled height of the torch from the workpiece using a mechanized carrier that travels along the workpiece on a guide track. In some examples, the guide track is generally circular to conform with a tubular workpiece, although other guide tracks may be configured to move along straight sections or non-circular sections. By eliminating the need for an enclosure, particularly when welding a pipeline in the field, and by optionally consolidating various welding equipment on a skid that can be relocated on a transport vehicle without disassembly, the size, weight, and footprint occupied by the welding equipment may be greatly reduced as compared with conventional pipeline welding.

This disclosure is also directed, in part, to a portable helper station for welding a workpiece in the field. The portable helper station may be a subset of a larger system disclosed herein, which may be field assembled with any of a variety of other equipment. The helper station may be used in conjunction with a gasless welding system and method such as described herein. Alternatively, the helper station may be configured for use with a gas shielded system and method.

In an example embodiment, the helper station comprises a frame positionable to orient the helper station with respect to the workpiece to be welded. The frame is transportable to a welding site and removably securable to a lifting arm, which may be a mechanized lifting arm (e.g. electrically and/or hydraulically raised, lowered, and/or rotated). A wire feeder may be carried on the frame, for feeding a consumable welding wire to a gasless torch in electrical communication with a welding machine that is interconnected with the helper station in the field. The wire feeder and gasless torch may generate an electrical arc between the consumable welding wire and the workpiece. A user interface may be electrically connected and physically mountable on the frame. The user interface may have at least a first controller configured to operate the wire feeder, and one or more other controllers such as to control the motion of the lifting arm, the motion of mechanized carrier on a track, and/or the position of the gasless torch with respect to the mechanized carrier.

For purposes of this disclosure, there are four main categories of welding identified. These are generally categorized according to the level of human intervention required. A first category is manual welding, which involves a handheld electrode or "stick" above the workpiece. The stick gets consumed while welding, and the user may manually adjust a spacing between the stick and the workpiece. A second category is semi-automated welding using a hand-held torch. A continuous electrode may be fed to the torch, and an inert gas may be supplied from the torch to protect the weld. A third category is mechanized welding, wherein the torch, itself is guided by a device, and a human provides active, electronic control input to make minor adjustments to the device while welding. An inert gas may also be supplied to protect the weld. An example of a mechanized welding system is the Bug and Band™ family of welding systems provided by Pipeline Supply & Service, LLC. In a Bug and Band system, a band disposable about a circular workpiece in the vicinity of a joint to be welded provides a track to guide a welding device (the "bug") that moves along the track in response to human input. A fourth category is automated welding, in which a robot performs the entire weld from start to finish, generally without active human input during the welding.

As used in any of the following embodiments, the "torch" may refer to a welding gun, that can be alternately referred to as a torch, gun, or welding torch. The torch may be the mechanism that is nearest the work piece being welded where the welding wire exits.

Figure 3:
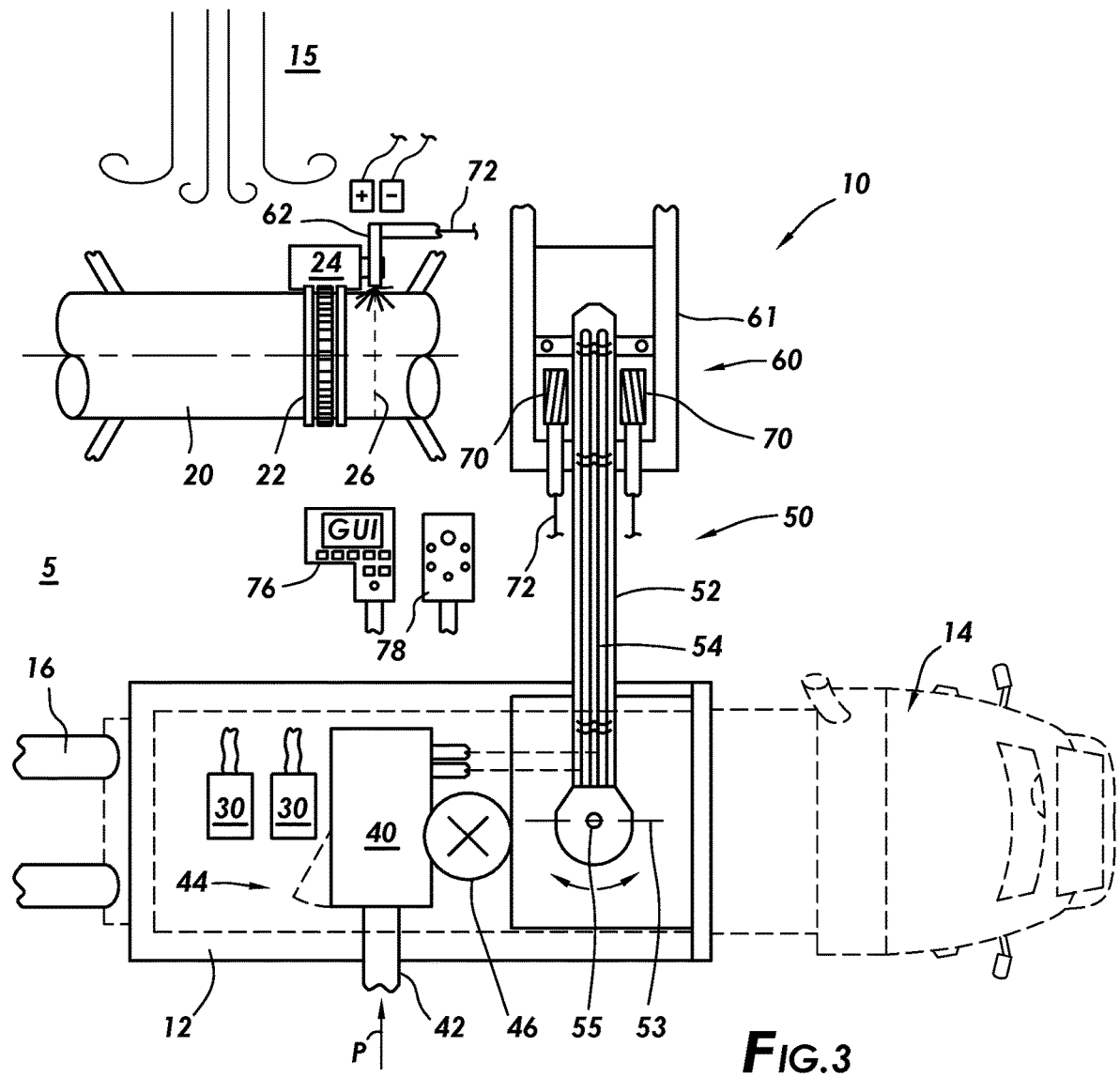
FIG. 3 is a schematic, plan view of a welding system for welding a tubular workpiece according to an embodiment of this disclosure.

FIG. 3 is a schematic, plan view of a welding system 10 for welding a tubular workpiece 20 according to an embodiment of this disclosure. The tubular workpiece 20 may be at a worksite 5. The worksite 5 may be exposed to an abundance of wind 15 as would typically be present in large, open places where pipelines are constructed. And yet, the system 10, according to the gasless welding and other various aspects below, may weld without the need for a weld shack such as in FIG. 1.

The tubular workpiece 20 may be any generally tubular structure formed of a base material that can be welded. The tubular workpiece 20 may be referred to in specific examples as a pipeline 20 or pipeline segment by way of example and not by limitation. The tubular workpiece 20 may be a ferrous or non-ferrous metal although aspects of this disclosure may be applied to any tubular structure of weldable material. The tubular workpiece 20 is also of generally circular cross-section in this example, although a tubular workpiece need not have a circular or perfectly-round cross-section, and so other shapes are also within the scope of this disclosure in terms of what may be welded. The weld may be performed, for example, along an interface between two pipeline segments butted end-to-end. Alternatively, the weld may be performed along a portion of the tubular workpiece 20 to be repaired, such as a crack.

The system 10 in this example includes a plurality of welding equipment transportable to a work site 5, optionally on a skid 12 and without disassembly prior to transport. Thus, substantially all of the equipment mounted on the skid may remain assembled/secured to the skid during transport if desired. The welding equipment on the skid 12 in FIG. 3 includes, for example, at least one welding machine 30 (two redundant units are shown here) for generating a controlled voltage, a power supply 40 for powering the welding machine 30, and a boom 50 including a lifting arm 52. Additional welding equipment may be provided at a helper station 60. The power supply 40 may generate or otherwise supply electrical power to be used by the welding machines 30 and other equipment discussed herein. A main power input schematically shown at 42 provides the power of whatever kind consumed by the power supply 40 itself. For instance, the main power input 42 may be a main electrical power source provided for this skid 12 and for various other systems on the worksite 5, however that may be supplied, such as by on-site generators, a connection to local power grid, and so forth. The power supply 40 may generate a specific range or set of one or more electrical current parameters suitable for at least the welding machines 30. Optionally, the welding machines 30 and/or the power supply 40 could be configured to also generate a specific range or set of one or more electrical current parameters suitable for use by the various other equipment in the system 10, such as specific voltage and current parameters of direct current (DC) and/or alternating current (AC) used by different equipment.

The system 10 may also support wireless data gathering and transmission from the skid or helper to a remote location (cloud, onsite data center, customer data center, data center, etc.) Electrical and data lines may be provided as needed between any of the various welding equipment, using any of a variety of cables, connectors, buses, wires, wiring harnesses, wireless connections of various protocols, and so forth. Some of these connections are indicated by way of example with dashed lines in FIG. 3. Electrical power and data or communication cables 54 are also shown routed along the boom 50 from components of the system 10 on the skid 12 to components of the system 12 at the helper station 60. It should be understood that physical and/or wireless connections can be made as needed, directly or indirectly, between different components of the system 10, and not every possible combination of electrical power and signal data communication is indicated in the drawing.

The welding machines 30, power supply 40, boom 50, and/or other welding equipment (although not necessarily all the welding equipment) are optionally mounted in this embodiment on a skid 12, for transportability of at least a portion of the welding system 10 to and from a work site 5 where the pipeline or other tubular workpiece 20 is to be welded. The skid 12 may be any portable structure to which some of the welding equipment may be mounted to transport that welding equipment on the skid to and from a worksite 5. The skid 12 in this example is an open structure for easy user access to the welding equipment mounted thereon. It may have a strong frame for the welding machine(s) 30, power supply 40, boom 50, and other welding equipment to be mounted to. The skid 12 and various equipment on it may be assembled and/or stored when not at the work site, such as at a remote storage or service facility (not shown).

The skid 12 and welding equipment mounted thereon may then be readily loaded onto and unloaded from a transport vehicle 14, depicted as a flatbed truck in this example. Conventional lifting equipment may be used to load or unload the skid 12 from the transport vehicle 14, such as using the tines of a forklift 16. Depending on the particular worksite and the job to be performed there, the skid 12 may either remain on the transport vehicle 14 while the welding job is completed, or unloaded from the transport vehicle 14 at the worksite. Because the system 10 is capable of welding a pipeline or other tubular structure outdoors without an enclosure to protect from the wind 15, the weight of a conventional welding shack can be eliminated. The weight of the skid 12 and the equipment mounted on the skid 12 may be very light weight in comparison. In at least some embodiments, the weight of the skid 12 and the welding equipment mounted thereon is less than about 7500 pounds (3400 Kg) in some embodiments, or up to 8500 pounds (3900 Kg) when including an expandable cover. As a result, the skid 12 may be easily transported to and from the worksite 5 without the heavy metal treads and special transportation measures and precautions normally associated with pipeline construction. Whereas conventional methods may require the use of metal treads to support the weight of a shack, the transport vehicle 14 in the present system may use non-metal (e.g. rubber) treads driven by one or more wheels, or even conventional tires such as in the example of a truck. This makes it easy to load the welding equipment onto a wide variety of transport vehicles with a much lower risk of damage to the roadways. However, although helpful, the skid and transport vehicle are not strictly required in every configuration. If desired, components of the system 10 could be individually transported and then assembled at the worksite 5.

Referring still to FIG. 3, the helper station 60 is secured to and suspended from the lifting arm 52 of the boom 50. The helper station 60 may comprise a frame 61 for supporting various equipment. The helper station 60 is configured, in part, for the convenience of a human user who may monitor and/or participate in the mechanized welding of the tubular workpiece 20. The helper station 60 is positionable at the worksite to orient the helper station 60 with respect to the tubular workpiece 20 to be welded and the human user who may operate it. For example, the skid 12 itself may be positioned and oriented at the worksite to position the helper station 60 near the tubular workpiece 20 to be welded. Further, the boom 50 may be moveable with respect to the skid 12, such as by raising or lowering the lifting arm 52 about an axis 53, or azimuthally by rotation of the lifting arm 52 about a pivot as indicated at 55. Thus, placement of the skid 12 and/or positioning of the lifting arm 52 may be used to bring the helper station 60 into proximity of the tubular workpiece 20 so that various other equipment is easily accessible by the user.

The helper station 60 is physically accessible to a human user who may perform or help with various aspects of welding the pipeline 20 using various input devices and with the help of the mechanized equipment disclosed. For example, the human user may be a skilled welder, who may be stationed at the helper station 60 within visual distance from the tubular workpiece 20 to visually monitor and adjust the weld process if needed. The helper station 60 carries one or more automatic wire feeder 70 for feeding a consumable welding wire 72 to a gasless torch 62 in electrical communication with the welding machine 30. The gasless torch 62 receives the consumable welding wire 72 as it is fed from the wire feeder 70. The gasless torch 62 receives a controlled voltage from the welding machine(s) 30 to generate an electrical arc between the consumable welding wire 72 and the tubular workpiece 20. Any number of user interfaces are electrically connected and optionally physically mountable on the helper station 60, such as a first controller 76 and a second controller 78 further discussed below. The first controller 76 may be used to operate the wire feeder 70, and the second controller 78 may provide for remote control of the welding process, for example. One of these or another controller may be used to control the boom.

The system 10 includes mechanized equipment in this example, to help control aspects of the welding process that may be harder for a human user to adjust. In particular, the system 10 includes a guide track 22 that is positionable about the tubular workpiece 20. The tubular workpiece 20 in this example has a circular cross-section and the guide track 22 may be shaped to conform to the cross-sectional shape. In this case the cross-sectional shape is circular, but a guide track may alternately be configured for other cross-sectional shapes (e.g. square or hexagonal tubing). A mechanized carrier 24 is moveably secured to the guide track 22 and moveable along the guide track 22, to guide the gasless torch 62 at a precise, controlled distance from the tubular workpiece 20. Any of a variety of tracks may be configured according to this disclosure whereby a mechanized carrier is moveably secured to the track. Just one example of a suitable track and mechanized carrier is the Bug and Band™ system offered by Pipeline Supply & Service, LLC, wherein the "band" comprises the track and the "bug" comprises the mechanized carrier. Instead of the human operator manually holding the gasless torch 62 by hand, the gasless torch 62 is clamped to the mechanized carrier 24, and the mechanized carrier 24 moves along the guide track 22 while holding the gasless torch 62 adjacent to the tubular workpiece 20 to weld along a weld path 26. This contributes, in part, to performing a quality weld, such as by holding the gasless torch 62 at a consistent distance from the tubular workpiece 20 and creating a uniform, quality weld bead.

A user interface is provided in electrical communication with the mechanized carrier 24, for controlling one or both of motion of the mechanized carrier 24 along the guide track 22 and a lateral position of the gasless torch 62 relative to the weld path 26, in response to real-time user input during welding of the tubular workpiece 20. The user interface in this example comprises a first controller 76 having a graphical user interface (GUI) for controlling the wire feeder 70 and a second controller 78 for controlling movement of the mechanized carrier 24 along the guide track 22. Any of a variety of inputs may be provided on these handheld controllers 76, 78, such as physical or electronic buttons, dials, switches, and the like, or an interactive touchscreen. For example, the second controller 78 may be used to selectively start and stop the welding process and coordinated movement of the mechanized carrier 24 along the guide track 22. The second controller 78 may also be used to control a relative position of the gasless torch 62, such as the lateral position, for the human operator to follow the intended well path 26.

Although the system 10 of FIG. 1 is configured for assistance by a human operator, alternative embodiments may instead use an automatic controller in electrical communication with the mechanized carrier 24. For example, the automatic controller may comprise an optical sensor for sensing a position of the mechanized carrier 24 relative to the tubular workpiece 20 and the weld path 26. The optical controller may control motion of the mechanized carrier 24 along the guide track 22 in response to the sensed position, such as to start/stop and steer left/right to closely track the desired weld path 26. Then, instead of hand-held controllers 76, 78, the automatic controller may be wired into or otherwise included with control logic, which may be provided on or in connection to the helper station 60.

In addition to eliminating the need for a bulky, heavy shack or other weld enclosure, the arrangement and configuration of the welding equipment on the skid 12 results in a desirably very compact system with a relatively small footprint. In a further aspect, the power supply 40 has a cabinet with one-sided access. Everything the human user may need to access is available on the same side 44 of its chassis. For instance, the electrical outlets and maintenance panel may be both accessible from the same side 44. This may avoid the need for standing room on the opposite side 46 of the chassis 44 indicated with an "X."

Additional figures are provided to show particular example configurations of the system 10 of FIG. 3 and examples of various welding equipment included therewith. One of ordinary skill in the art will appreciate that the system 10 and related methods disclosed and/or claimed may be assembled in some configurations using items of equipment that, individually, may be commercially available. Embodiments of this disclosure are not, however, limited to the specific items of equipment shown.

Figure 4:
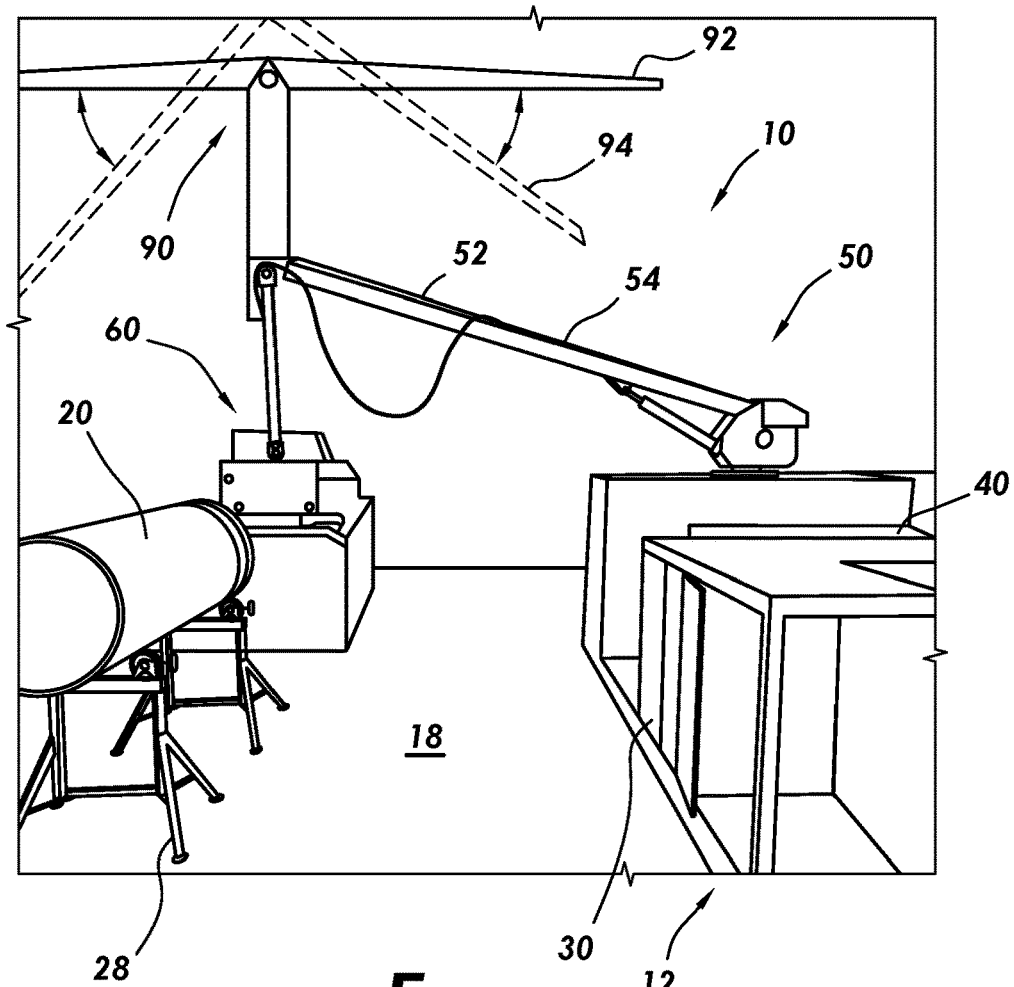
FIG. 4 is a side view of an example implementation of the welding system of FIG. 3.

FIG. 4 is a side view of an example implementation of the welding system of FIG. 3 as implemented for demonstration purposes in a lab-type setting. The tubular workpiece 20 in this example is a pipeline segment propped up on a stand 28. The arm 52 of the boom 50 is moveable in this example, to raise and lower the arm 52 and the helper station 60 suspended therefrom. Electrical power and data communication cables 54 are routed along the arm 52 from the welding equipment on the skid 12 to the helper station 60. A cabinet is provided for receiving the welding machines 30 and power supply 40, with room for additional equipment. Alternatively, the skid 12 could be shortened to further reduce the footprint of the skid 12 where additional equipment capacity is not required. A user may stand and work in a work area 18 with convenient access to the tubular workpiece 20, the welding machines 30, the power supply 40, and the helper station 60, while remaining within the work area 18.

FIG. 4 further illustrates an optional collapsible cover 90 that can be used at a remote worksite to help protect the user and equipment. The collapsible cover 90 may be coupled to the boom 50 over the helper station 60. The collapsible cover 90 can be opened to an expanded position 92 that covers an area overhead of one or more of the helper station 60, the mechanized carrier 24 (FIG. 5), and a portion of the tubular workpiece 20 including the weld path. The collapsible cover 90 may be moved to a collapsed position as indicated at 94 (dashed linetype shows it being moved between fully open and fully closed), for transporting the system 10 to and from the worksite 5.

Figure 5:
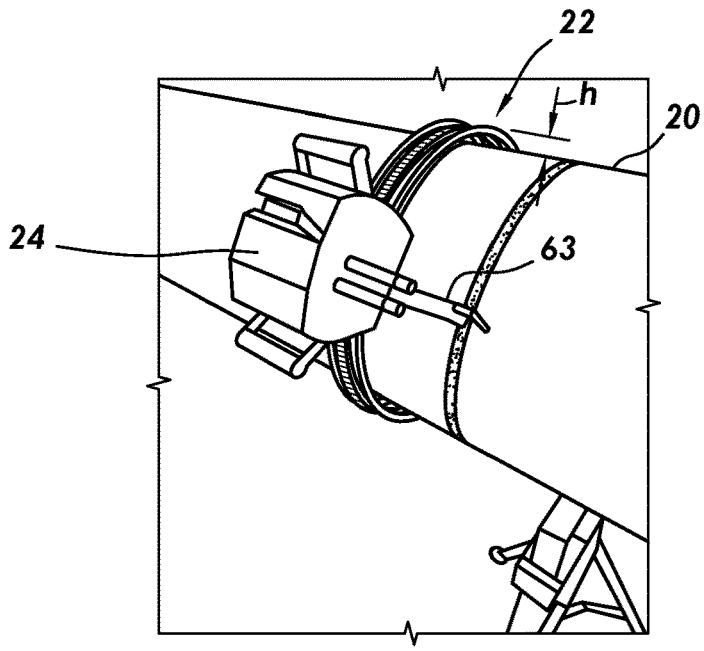
FIG. 5 is a perspective view of the tubular workpiece on which the guide track and mechanized carrier are installed

FIG. 5 is a perspective view of the tubular workpiece 20 on which the guide track 22 and mechanized carrier 24 are installed. As can be seen, the guide track 22 in this example is generally circular to conform to the generally circular outer diameter (OD) of the tubular workpiece. The system 10 works with a tubular workpiece 20 having a diameter as small as about 8 inches (20 cm). For example, in cross-country pipeline welding 50 miles can be run at 36 inch diameter.

An attachment mechanism is provided on the mechanized carrier 24 for attaching the gasless torch 62 at the desired position. An alternative configuration optionally allows for interchangeably supporting the gasless torch 62 or one or more other tools, such as a paint sprayer or a sand blaster. Thus, in addition to being able to weld the tubular workpiece 20 using the gasless torch 62, one of the other attachments may be used to paint or sand-blast at least a portion of the OD of the tubular workpiece 20, such as along the weld path 26 of FIG. 3.

The gasless torch (FIG. 3) may be held on the right or left side of the mechanized carrier 24. The gasless torch could be located at any orientation to the mechanized carrier that allows access to the tubular workpiece 20 and weld path 26. The guide track 22 is offset a uniform distance "h" from the OD of the tubular workpiece 20, to maintain the gasless torch a uniform distance from the OD as the mechanized carrier 24 travels around the tubular workpiece 12. In one or more embodiments, the guide track 22 may have a certain amount of flexibility or conformability, or may otherwise be pre-fabricated, to adapt to workpiece cross-sections that may be slightly off-round or even different shapes.

Figure 6:
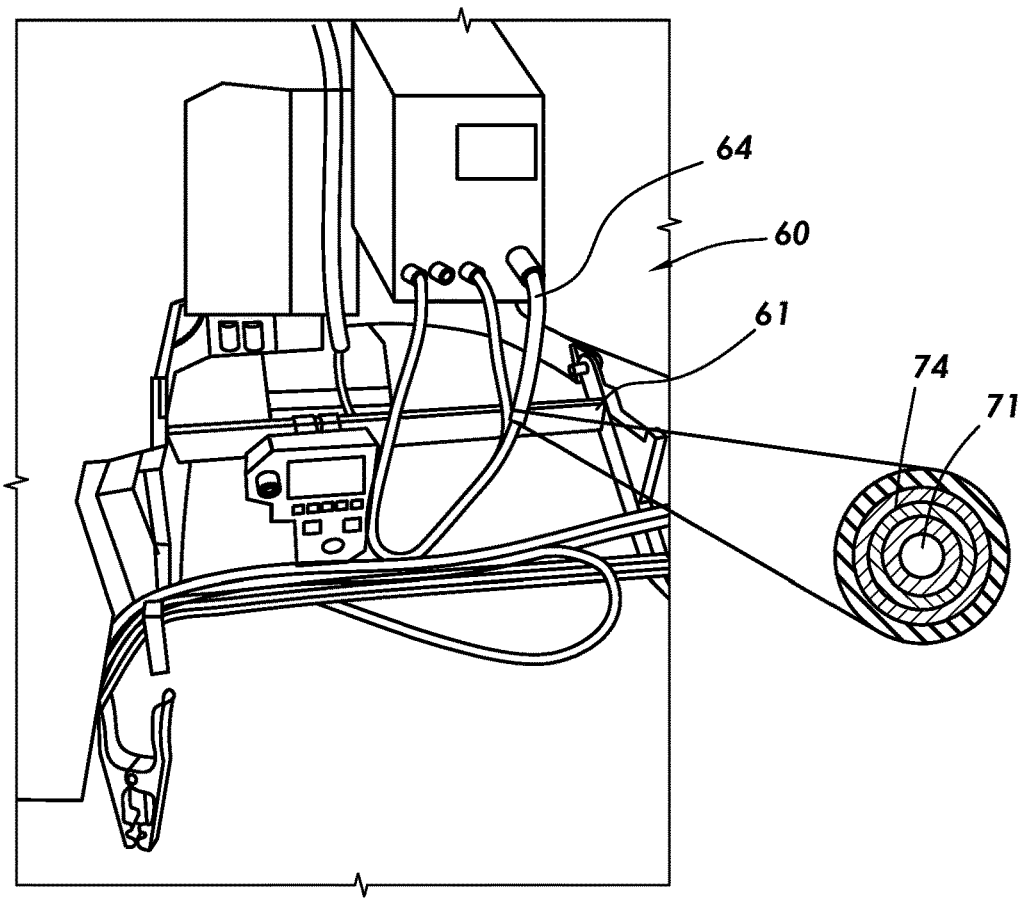
FIG. 6 is a side view of an example implementation of the helper station with various equipment installed on or connected thereto.

FIG. 6 is a side view of an example implementation of the helper station 60 with various equipment installed on or connected thereto. The helper station 60 is configured for use with a gasless welding system and method as described herein, but, alternatively, may support various welding equipment installed on or connected thereto in association with a gas-shielded welding system or method. The frame 61 of the helper station 60 is open in this example, with space between the frame members to allow for ingress and egress of various cabling and other features. A robust, flexible guide cable 64 is provided for guiding the consumable welding wire 72 as it is being fed from the automatic wire feeder 70. The guide cable 64 contains a housing lined with a polymer for receiving the consumable welding wire along at least a portion of a guide path from the wire feeder 70 to the gasless torch 62. A sectional view of the flexible guide cable 64 shows an internal example configuration including an outermost protective housing, an inner housing 74 within the protective housing, and a polymer liner such as a polytetrafluoroethylene liner 76 inside the inner housing 74. The consumable welding wire 71 is disposed within the polytetrafluoroethylene liner 76, which facilitates uniform feeding of the consumable welding wire 71 to the gasless torch. The uniform feeding of the consumable welding wire 71 helps ensure a uniform and stable wire feed rate (length of wire per unit of time) is delivered to the workpiece. Since gasless welding is particularly sensitive to wire feed speed and voltage at the workpiece, this polytetrafluoroethylene-lined cable configuration is yet another aspect that helps enable gasless welding approach that eliminates the shack.

Figure 7:
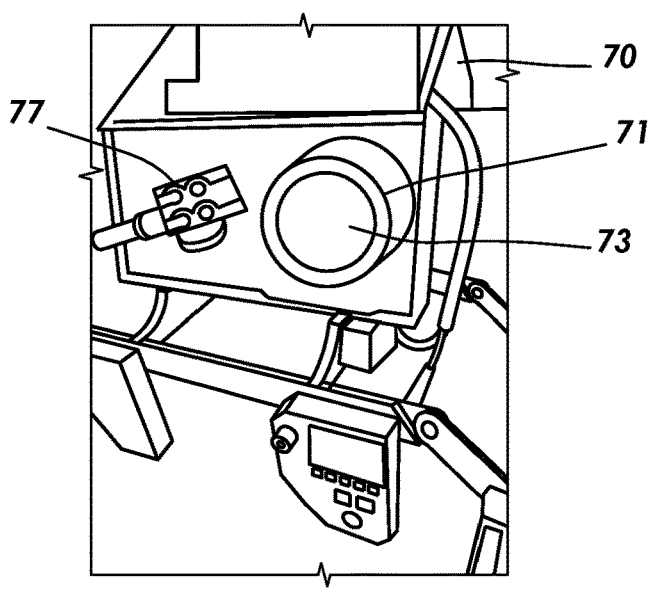
FIG. 7 is a side view of the wire feeder carried on the helper station.

FIG. 7 is a side view of the automatic wire feeder 70 carried on the helper station 60. A panel is open to reveal the consumable welding wire 71 coiled around a spool 73. The wire 71 is fed from the spool 73 to the gasless torch via an injector 77.

Figure 8:
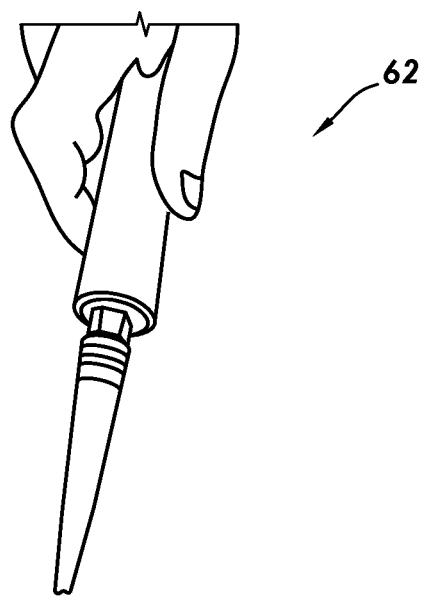
FIG. 8 is a perspective view of the gasless torch connection at which voltage is locally measured.

FIG. 8 is an exposed view of a connection 66 of the gasless torch 62 at which voltage is locally measured at the workpiece instead of or in addition to at the welding machines. A voltage sensor included on the gasless torch 62 senses an arc voltage at the tubular workpiece. Due to impedance losses in electronic cabling, the voltage measured at the gasless torch 62 is more representative of the actual voltage of the arc than a voltage taken at the welding machine. This helps ensure tighter and more responsive control of the voltage to further facilitate a gasless welding approach. The welding machine 30 of FIGS. 3 and 4 is configured for adjusting the controlled voltage supplied by the welding machine 30 to the torch 62 in response to the arc voltage sensed by the voltage sensor. A difference between the controlled voltage supplied by the welding machine 30 (FIG. 3) and the arc voltage sensed by the voltage sensor in the gasless torch 62 in some embodiments is less than +/−1 V.

Figure 9:
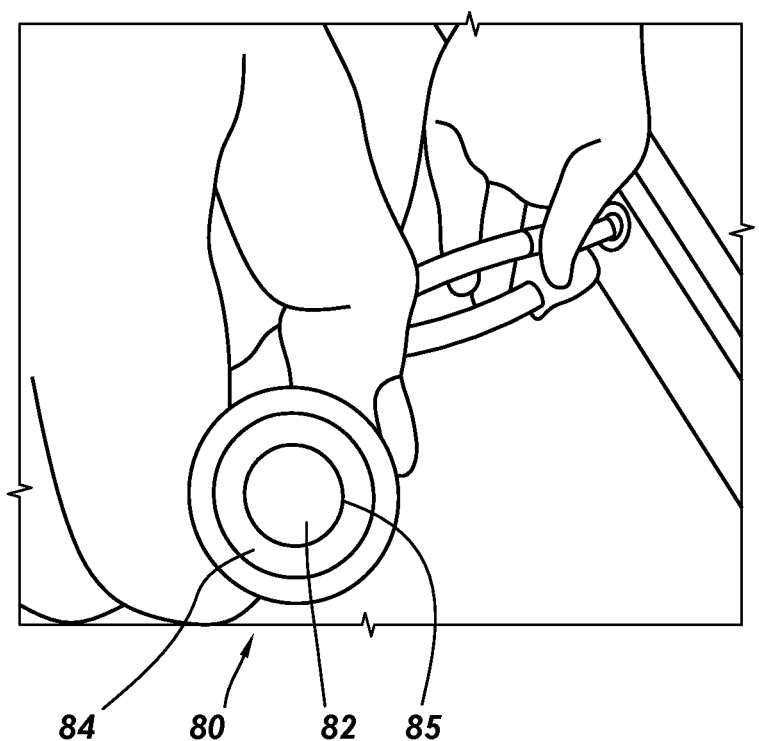
FIG. 9 is a cutaway view of an example coaxial cable for facilitating low-impedance, high-accuracy control of the voltage at the gasless torch connection.

FIG. 9 is a cutaway view of an example coaxial cable 80 for facilitating low-impedance, high-accuracy control of the voltage at the gasless torch connection. The coaxial cable comprises an inner wire 82 disposed within an outer wire 84 and separated by an insulating layer 85. The coaxial cable supplies the controlled voltage from the welding machine 30 to the gasless torch 62 of FIG. 8.

What is claimed is:

1. A system for welding a tubular workpiece, the system comprising:
   a plurality of welding equipment for transportation to a work site, the welding equipment including a welding machine for generating a controlled voltage, a power supply for powering the welding machine, and a boom including a lifting arm;
   a helper station secured to the lifting arm, positionable to orient the helper station with respect to the tubular workpiece to be welded;
   a wire feeder carried on the helper station, the wire feeder configured for feeding a consumable welding wire;
   a gasless torch in electrical communication with the welding machine and configured for receiving the consumable welding wire from the wire feeder and generating an electrical arc between the consumable welding wire and the tubular workpiece;
   a guide track positionable with respect to the tubular workpiece; and
   a mechanized carrier moveably secured to the guide track and moveable along the guide track while holding the gasless torch adjacent to the tubular workpiece.

2. The system of claim 1, further comprising:
   a coaxial voltage cable comprising an inner wire disposed within an outer wire separated by an insulating layer, the coaxial cable supplying the controlled voltage from the welding machine to the gasless torch.

3. The system of claim 1, further comprising:
   a voltage sensor included on the gasless torch for sensing an arc voltage at the tubular workpiece;
   wherein the welding machine is configured for adjusting the controlled voltage supplied by the welding machine to the torch in response to the arc voltage sensed by the voltage sensor.

4. The system of claim 3, wherein a magnitude of a difference between the controlled voltage supplied by the welding machine and the arc voltage sensed by the voltage sensor is less than 1 volt (V).

5. The system of claim 1, further comprising:
   a user interface in electrical communication with the mechanized carrier, for controlling one or both of motion of the mechanized carrier along the guide track and lateral position of the gasless torch relative to a weld path in response to real-time user input during welding of the tubular workpiece.

6. The system of claim 1, further comprising:
   an automatic controller in electrical communication with the mechanized carrier, the automatic controller comprising an optical sensor for sensing a position of the mechanized carrier and for controlling motion of the mechanized carrier along the guide track in response to the sensed position.

7. The system of claim 1, wherein an enclosure is not provided about the tubular workpiece and the system so that the system is not protected from wind when welding the tubular workpiece.

8. The system of claim 1, further comprising:
   a skid supporting at least the welding machine and the boom, the skid being transported to a work site on a transport vehicle.

9. The system of claim 8, wherein the transport vehicle comprises:
   a band of non-metal treads driven by two or more wheels.

10. The system of claim 9, wherein the lifting arm is moveably supported on the skid to adjust the position of the helper station with respect to the tubular workpiece at least by moving the lifting arm.

11. The system of claim 8 whereas the skid is transportable on the transport vehicle without disassembly.

12. The system of claim 1, further comprising one or more user controls for a user to operate one or more of the welding machine, the wire feeder, and the boom.

13. The system of claim 1, wherein the tubular workpiece comprises one or more pipeline segments to be welded end-to-end.

14. The system of claim 13, wherein a weld path is along an interface between two adjacent pipeline segments end-to-end.

15. The system of claim 1, wherein a weld path is along a portion of a pipeline to be repaired.

16. The system of claim 1, further comprising:
   a collapsible cover coupled to the boom, the collapsible cover moveable between an expanded position that covers an area overhead of one or more of the helper station, the mechanized carrier, and a portion of the tubular workpiece including a weld path, and a collapsed position.

17. The system of claim 1, wherein the power supply comprises a chassis having a maintenance panel and an electrical outlet panel on a same side of the chassis.

18. The system of claim 1, further comprising:
   a wireless connection configured for data gathering and/or transmission from the skid and/or helper station to a remote location.

19. A portable helper station for welding a workpiece, the helper station comprising:
   a frame positionable to orient the helper station with respect to the workpiece, the frame transportable to a welding site and removably securable to a lifting arm;
   a wire feeder carried on the frame, the wire feeder configured for feeding a consumable welding wire to a gas shielded or gasless torch in electrical communication with a welding machine to generate an electrical arc between the consumable welding wire and the workpiece; and a user interface electrically connected and physically mountable on the frame, including at least a first controller configured to operate the wire feeder.

20. The portable helper station of claim 19, further comprising:
   a guide track removably positionable about the workpiece; and
   a mechanized carrier moveably secured to the guide track and moveable along the guide track while holding the gas shielded or gasless torch adjacent to the workpiece, the mechanized carrier in electrical communication with the user interface; and
   wherein the guide track and mechanized carrier are transportable to the welding site.

21. The portable helper station of claim 20, wherein the workpiece is a tubular workpiece and the guide track is oriented along a circumference of the tubular workpiece to guide the mechanized carrier along the circumference of the tubular workpiece.

22. The portable helper station of claim 20, wherein the user interface is further for remote control of a welding process including one or both of motion of the mechanized carrier along the guide track and lateral position of the gas shielded or gasless torch relative to a weld path in response to real-time user input during welding of the workpiece.

23. The portable helper station of claim 19, wherein the lifting arm is controllable by the user interface to raise, lower, and/or rotate the lifting arm.

24. The portable helper station of claim 19, further comprising:
   a coaxial voltage cable comprising an inner wire disposed within an outer wire separated by an insulating layer, the coaxial cable supplying the controlled voltage from the welding machine to the gas shielded or gasless torch.

25. The portable helper station of claim 19, further comprising:
   a voltage sensor included on the gas shielded or gasless torch for sensing an arc voltage at the workpiece; and
   wherein the welding machine is configured for adjusting the controlled voltage supplied by the welding machine to the torch in response to the arc voltage sensed by the voltage sensor.

26. The portable helper station of claim 19, further comprising:
   an attachment mechanism for interchangeably supporting the gas shielded or gasless torch or one or more other tools, the one or more other tools selected from the group may consist of a paint sprayer, sand blaster, heating apparatus or any other apparatus.

27. The portable helper station of claim 19, further comprising:
   a collapsible cover securable to the lifting arm, the collapsible cover moveable between an expanded position and a collapsed position, wherein the collapsible cover covers an area overhead of at least the helper station in the expanded position.

28. The system of claim 1, wherein the guide track is positionable about the tubular workpiece along its circumference.

29. The system of claim 1, wherein the guide track is positionable along a straight section of the tubular workpiece.

* * * * *